US012109579B2

(12) United States Patent
Shin

(10) Patent No.: US 12,109,579 B2
(45) Date of Patent: Oct. 8, 2024

(54) MULTI-NEEDLE HEAD, METHOD OF ALIGNING END PORTION OF MULTI-NEEDLE HEAD, AND ALIGNMENT DEVICE USED THEREIN

(71) Applicant: GOSANTECH CO., LTD., Cheonan-si (KR)

(72) Inventor: Dongkyun Shin, Sejong-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 317 days.

(21) Appl. No.: 17/695,976

(22) Filed: Mar. 16, 2022

(65) Prior Publication Data

US 2022/0331835 A1 Oct. 20, 2022

(30) Foreign Application Priority Data

Apr. 14, 2021 (KR) ........................ 10-2021-0048627

(51) Int. Cl.

| | |
|---|---|
| ***B05D 1/02*** | (2006.01) |
| ***B05B 5/035*** | (2006.01) |
| ***B05B 5/16*** | (2006.01) |
| ***B05B 13/02*** | (2006.01) |
| ***B05B 15/60*** | (2018.01) |

(52) U.S. Cl.

CPC .............. *B05B 15/60* (2018.02); *B05B 5/035* (2013.01); *B05B 5/16* (2013.01); *B05B 13/0278* (2013.01); *B05D 1/02* (2013.01)

(58) Field of Classification Search

None

See application file for complete search history.

(56) References Cited

FOREIGN PATENT DOCUMENTS

| | | | |
|---|---|---|---|
| CN | 1678369 A | | 10/2005 |
| CN | 103681443 A | | 3/2014 |
| JP | 11-38017 A | | 2/1999 |
| JP | 11038017 A | * | 2/1999 |
| JP | 2011-156338 A | | 8/2011 |
| KR | 10-0331993 B1 | | 4/2002 |
| KR | 10-0684292 B1 | | 2/2007 |
| KR | 10-0836274 B1 | | 6/2008 |

(Continued)

OTHER PUBLICATIONS

Korean Office Action dated Jun. 17, 2022 in Korean Application No. 10-2021-0048627.

(Continued)

*Primary Examiner* — Michael P. Rodriguez

(74) *Attorney, Agent, or Firm* — Sughrue Mion, PLLC

(57) ABSTRACT

Proposed is a multi-needle head. The multi-needle head includes at least one adapter mounted with a needle in which liquid is discharged therethrough, and includes a holder in which the adapter is fixed. An O-ring having an outer diameter thereof larger than a width of a body of the adapter is coupled to the body of the adapter, a fixing hole into which the body of the adapter is inserted is formed in the holder, and an O-ring fixing portion having an inner diameter thereof larger than an inner diameter of the fixing hole is formed in the middle of the fixing hole such that the O-ring is positioned at the O-ring fixing portion. A vertical width of the O-ring fixing portion is larger than a vertical width of the O-ring, thereby allowing a height of the adapter that is fixed to the holder to be adjusted.

8 Claims, 13 Drawing Sheets

(56) References Cited

FOREIGN PATENT DOCUMENTS

| | | | |
|---|---|---|---|
| KR | 10-2010-0119880 | A | 11/2010 |
| KR | 10-1415609 | B1 | 7/2014 |
| KR | 10-1982826 | B1 | 5/2019 |
| KR | 10-2176015 | B1 | 11/2020 |

OTHER PUBLICATIONS

Communication dated Nov. 1, 2023, issued in Chinese Application No. 202210246830.7.

* cited by examiner

MULTI-NEEDLE HEAD, METHOD OF ALIGNING END PORTION OF MULTI-NEEDLE HEAD, AND ALIGNMENT DEVICE USED THEREIN

CROSS REFERENCE TO RELATED APPLICATION

The present application claims priority to Korean Patent Application No. 10-2021-0048627, filed Apr. 14, 2021, the entire contents of which are incorporated herein for all purposes by this reference.

BACKGROUND OF THE INVENTION

Field of the Invention

The present disclosure relates to a needle head that discharges liquid. More particularly, the present disclosure relates to a multi-needle head in which a plurality of needles is mounted, a method of aligning each end portion of the plurality of needles, and an alignment device used therein.

Description of the Related Art

Currently, in the industrial field, a device that discharges liquid is used for various purposes. For example, liquid is discharged on the desired position to form a pattern for a purpose of drawing a specific shape such as an electric circuit and so on. Further, liquid is thinly discharged in order to manufacture a thin fiber, or liquid is discharged on a surface of a coating target object in order to coat the surface of the coating target object.

As an example of a technology in which a circuit pattern is formed and liquid is discharged at the desired position on fine electronics, there is an inkjet printing that is developed from a printing device. Further, there is an electro-spinning as an example of a liquid discharge technology for manufacturing a fiber, and there is an electro-spraying as an example of the liquid discharge technology for coating a target object. Although these liquid discharge technologies differ in the specific technology that discharges liquid, these liquid discharge technologies coincide with each other in terms of discharging liquid through a nozzle provided in a head. However, the specific shape of the nozzle may be variously changed. Further, when the nozzle provided in the head is formed in a shape of a needle, the nozzle is referred to as a needle head. In the electro-spinning technology and the electro-spraying technology, the needle head is very frequently used, and the needle head is applied in the inkjet printing depending on the need.

Meanwhile, conventionally, the needle head provided with only a single needle in the head through which liquid is discharged has been mainly used. However, recently, an application of a multi-needle head which is provided with a single head and which discharges liquid through a plurality of needles is increasing for various purposes. In the electro-spinning, instead of forming single fiber, the multi-needle head is applied when a web and so on are manufactured. Further, in the electro-spraying, a process efficiency is increased by using the multi-needle head since a spraying area is widened.

However, there is a problem that the multi-needle head is difficult to match end portions of the needles compared to a conventional nozzle. When a highly precise operation such as forming of a very thin coating layer is performed, the difference in protruding lengths of needles becomes a problem. When the protruding lengths of the needles are different, positions of end portions at which liquid is discharged are also different. Accordingly, when a coating layer is formed, each range to which the liquid sprayed from each needle reaches is different from each other, so that a uniform coating layer cannot be realized.

DOCUMENT OF RELATED ART (Patent Document 1) Korean Patent No. 10-1982826
(Patent Document 2) Korean Patent No. 10-0684292
(Patent Document 3) Korean Patent No. 10-2176015
(Patent Document 4) Korean Patent No. 10-0836274

SUMMARY OF THE INVENTION

Accordingly, the present disclosure has been made keeping in mind the above problems occurring in the related art, and an objective of the present disclosure is to provide a new type of a multi-needle head provided with a plurality of needles in which positions of end portions of the needles can be easily aligned, to provide a method of aligning the end portions of the multi-needle head, and to provide an alignment device used therein.

In order to achieve the above objective, there is provided a multi-needle head including: at least one adapter mounted with a needle in which liquid is discharged therethrough; and a holder in which the adapter is fixed, wherein an O-ring having an outer diameter thereof larger than a width of a body of the adapter is coupled to the body of the adapter, a fixing hole into which the body of the adapter is inserted is formed in the holder, and an O-ring fixing portion having an inner diameter thereof larger than an inner diameter of the fixing hole is formed in the middle of the fixing hole such that the O-ring is positioned at the O-ring fixing portion, wherein a vertical width of the O-ring fixing portion is larger than a vertical width of the O-ring, thereby allowing a height of the adapter that is fixed to the holder to be adjusted.

The present disclosure relates to the multi-needle head used in a device that discharges liquid. Further, the present disclosure is not limited to a method and a purpose of discharging liquid, and is variously applied to a device using a needle on a nozzle that discharges liquid. Particularly, the present disclosure is suitable for an electro-spraying device that widely spreads and discharges fine droplets from an end of the needle.

In the multi-needle head that discharges liquid by mounting a plurality of needles on a single head, there is an advantage that the efficiency of a process is increased, but there is a problem that an accuracy of the process is decreased when heights of the end portions of the needles are not aligned. In conventional multi-needle heads, the heights of the end portions of the needles are unable to be adjusted, or it is difficult to adjust the heights of the end portions of the needles since an individual adjustment is required. In comparison with the conventional multi-needle heads, the multi-needle head of the present disclosure has an excellent effect that heights of the end portions of the needles are capable of being aligned to be the same by a new structure in which heights of adapters on which the needles are mounted are capable of being adjusted.

The holder may be formed of a plurality of parts that is cut on the basis of the fixing hole, and the plurality of parts may be assembled after the adapter to which the O-ring is coupled is inserted into the holder while the plurality of parts that forms the holder is in a separated state.

When the holder formed of the plurality of parts is assembled, a position of the adapter may be fixed. Further, the height of the adapter may be adjusted during a temporally assembled state in which the holder is not completely fastened, and the height of the end portion of each needle is aligned, so that the height of the end portion of each needle may be fixed to the aligned height by completely assembling the holder.

In addition, the multi-needle head may further include a manifold which is coupled to an upper portion of the holder and which is configured to supply the liquid to a plurality of needles, wherein a housing of the manifold may be provided with a cavity which is filled with the liquid and which is formed on a position corresponding to the adapter, and the housing of the manifold may be provided with a supply pipe through which the liquid is supplied to the cavity and a collecting pipe through which the liquid inside the cavity is discharged outside.

In order to discharge the liquid at a constant discharge pressure from the plurality of needles that is mounted on the multi-needle head, the manifold provided with the cavity in which a predetermined amount of liquid can be filled is applied. At this time, there is a high possibility that bubbles may be generated during a process of filling the cavity with the liquid or bubbles may be generated by air remaining in the cavity. When bubbles are moved into the needles, bubbles interrupt the liquid from being moved into the needles having small diameters. However, generally, a pressure applied during a process of discharging the liquid cannot remove bubbles that block the needles. Therefore, there is a problem that entire device is required to be stopped in order to remove bubbles. Therefore, in the present disclosure, instead of a one-way structure having only the supply pipe that supplies liquid to the cavity, the collecting pipe through which the liquid is collected from the cavity is added. According to the present disclosure, since bubbles generated inside the cavity are discharged together with the liquid that is discharged through the collecting pipe, the problem that the liquid is blocked by bubbles and is not discharged does not occur.

In addition, the multi-needle head may further include an exhaust pipe connected to the cavity, wherein a valve configured to open and close the exhaust pipe may be mounted on the exhaust pipe.

In the present disclosure, the exhaust pipe capable of removing the air is added together with the collecting pipe through which the liquid is collected. Therefore, since the air inside the cavity is removed during a process of filling the cavity so as to use the liquid discharge device provided with the multi-needle head, there is an effect that bubbles are prevented from being generated inside the cavity.

According to another aspect of the present disclosure, there is provided a method of aligning an end portion of the needle of the multi-needle head of the present disclosure, the method including: temporally assembling a holder by inserting an adapter into a fixing hole of the holder and assembling the holder to an extent that a height of the adapter is capable of being adjusted; aligning a height of the end portion of the needle by adjusting the height of the adapter; and fixing the holder so that the height of the adapter is fixed.

In the multi-needle head of the present disclosure, when in the temporally assembled state in which the holder is not completely fastened, the adapters inserted into the holder are capable of being moved vertically. Further, in the temporally assembled state, when the holder is fully fastened and assembled after the heights of the end portions of the needles are aligned to be the same, the heights of the adapters are fixed and are not moved.

According to still another aspect of the present disclosure, there is provided a method of using a liquid discharge device including the multi-needle head of the present disclosure, the method including: preparing in which a cavity of a manifold is filled with liquid; and operating a discharging of the liquid through a needle after the cavity is filled with the liquid, wherein a valve of an exhaust pipe is opened during the preparing, and the valve of the exhaust pipe is closed during the operating.

In the multi-needle head of the present disclosure, the exhaust pipe connected to the cavity formed in the manifold may be included, and the valve configured to open and close the exhaust pipe may be included. In this structure, during the process of filling the cavity with the liquid before the operation is performed, when the valve is closed after the air inside the cavity is discharged after the valve is opened so as to discharge the air inside the cavity, microbubbles generated during an injection process is prevented from stagnating inside the cavity. At this time, when the valve is closed after a predetermined amount of liquid including bubbles is discharged through the exhaust pipe, bubbles inside the cavity will be more definitely removed.

According to yet another aspect of the present disclosure, there is provided a device for aligning an end portion of a needle of the multi-needle head of the present disclosure, the device including: a reference portion provided with a reference surface that is a flat surface capable of matching a height of the end portion of the needle to be constant; a stand provided with a stand surface on which a holder of the multi-needle head is placed, the stand being configured to maintain a space between the reference surface and the stand surface; and an adjusting portion capable of adjusting a space between a bottom surface of the holder and the reference surface, wherein when the multi-needle head is in a state of being placed on the stand surface, the space between the bottom surface of the holder and the reference surface is adjusted until each end portion of all of a plurality of needles is in contact with the reference surface.

In the multi-needle head of the present disclosure, the heights of the adapters can be adjusted while the holder is temporally assembled state. At this time, it is preferable that the alignment device is applied for more precise adjustment. When the temporally assembled holder is placed on the stand surface and the space between the bottom surface of the holder and the reference surface is narrowed by using the adjusting portion, the holder is gradually moved downward. Since the adapters inserted into the temporally assembled holder are capable of being moved vertically, the adapters in which the end portions of the needles are in contact with the reference surface are in a state in which movements thereof are stopped even if the holder is continuously moved downward. Further, when the holder is moved downward until all of the needles are in contact with the reference surface, the heights of the end portions of the needles become the same.

The reference surface may be inclined at a predetermined angle to the ground, and a stand surface may be arranged at an angle perpendicular to the reference surface so that the multi-needle head is diagonally placed.

During a process of adjusting the space between the holder and the reference surface, the weight of the adapter is applied to the needle that is in contact with the reference surface in advance, so that each of the needles in which the thickness thereof is thin may be deformed. When the stand surface is configured such that the holder that is diagonally tilted is capable of being positioned on the stand surface and the reference surface is disposed on a position corresponding to the configuration of the stand surface, the weight applied to the needles is dispersed, so that the problem that the needles are deformed during the alignment process may be prevented.

In the present disclosure configured as described above, since the heights of the adapters on which the needles are mounted are capable of being adjusted. Therefore, the heights of the end portions of the needles are capable of being aligned to be the same, and there is an excellent effect that accuracy of a process of discharging liquid is improved.

In addition, since the manifold provided with the cavity in which a predetermined amount of liquid can be filled is applied so as to discharge the liquid at a constant discharge pressure from the plurality of needles that is mounted on the multi-needle head and the collecting pipe through which the liquid is collected is added, bubbles generated inside the cavity are discharged through the collecting pipe, so that there is an effect that the problem that the needles are blocked by bubbles does not occur.

In addition, the exhaust pipe capable of removing the air is added together with the collecting pipe through which the liquid is collected from the cavity, and the liquid including microbubbles generated during the process of filling the cavity so as to use the liquid discharge device provided with the multi-needle head, so that there is an effect that bubbles are prevented from stagnating inside the cavity.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
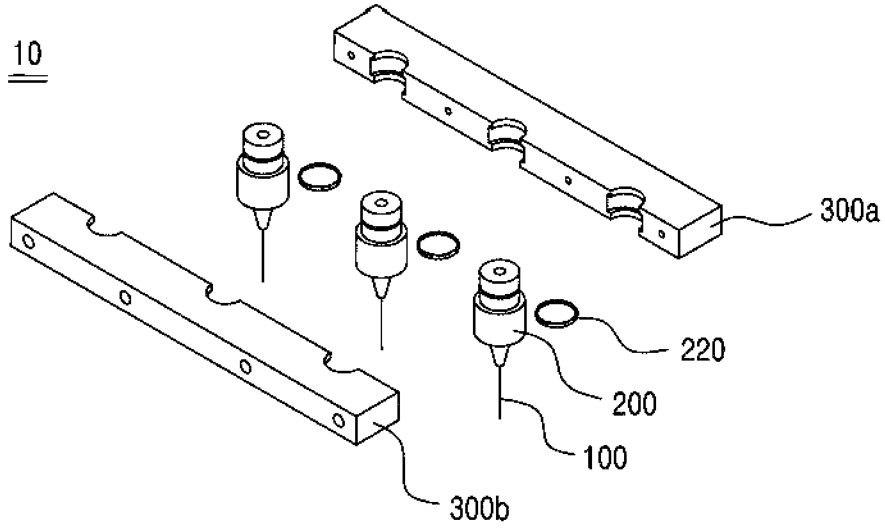
FIG. 1 is an exploded perspective view illustrating a configuration of a multi-needle head according to an embodiment of the present disclosure.

Hereinafter, an embodiment of the present disclosure will be described in detail with reference to the accompanying drawings.

However, embodiments of the present disclosure may be modified in a variety of different forms, and the scope of the present disclosure is not limited to the embodiments described below. The shapes and sizes of the elements in the drawings may be exaggerated for clarity, and elements denoted by the same reference numerals in the drawings are the same elements.

Throughout the specification, it will be understood that when an element is referred to as being "connected" to another element, it can be directly connected to the other element or it can be electrically connected with the other element and intervening elements may be present therebetween. In addition, it will be further understood that when a part "comprises", "includes", or "has" an element, this means that other elements are not excluded but may be further included, unless otherwise stated.

Also, the terms such as "first", "second", etc. may be used to distinguish one element from another element, and the scope of the present disclosure must not be limited by these terms. For example, a first constitutive element may be referred as a second constitutive element, and the second constitutive element may be also referred to as the first constitutive element.

Figure 2:
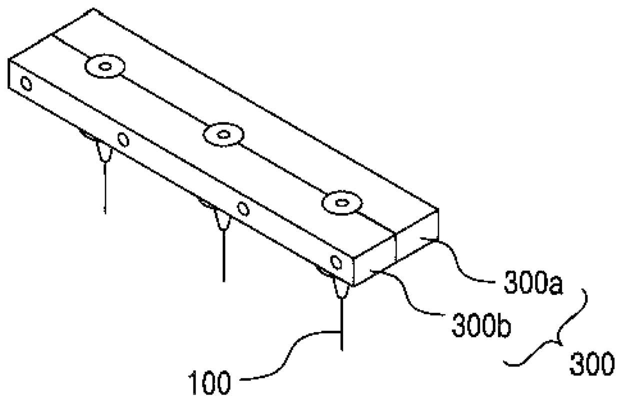
FIG. 2 is a perspective view illustrating a state in which elements in FIG. 1 are coupled.
Figure 3:
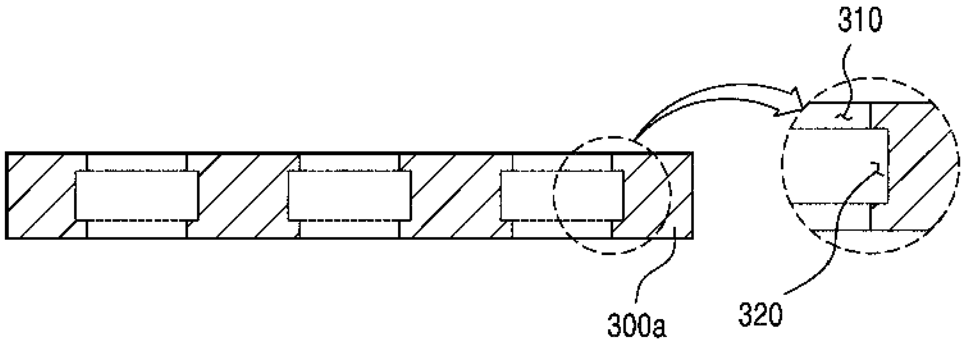
FIG. 3 is a view illustrating a structure of a holder that is applied to the multi-needle head according to an embodiment of the present disclosure.

FIG. 1 is an exploded perspective view illustrating a configuration of a multi-needle head according to an embodiment of the present disclosure. FIG. 2 is a perspective view illustrating a state in which elements in FIG. 1 are coupled. FIG. 3 is a view illustrating a structure of a holder that is applied to the multi-needle head according to an embodiment of the present disclosure.

Figure 4:
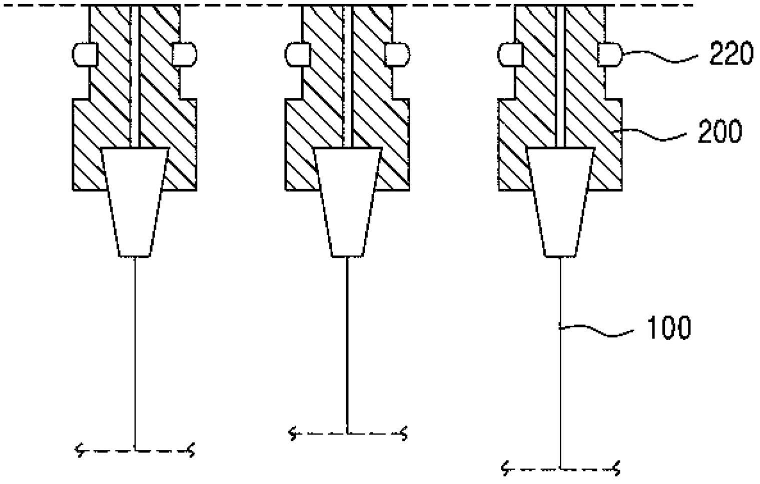
FIG. 4 is a cross-sectional view illustrating both needles and adapters that are applied to the multi-needle head according to an embodiment of the present disclosure.
Figure 5:
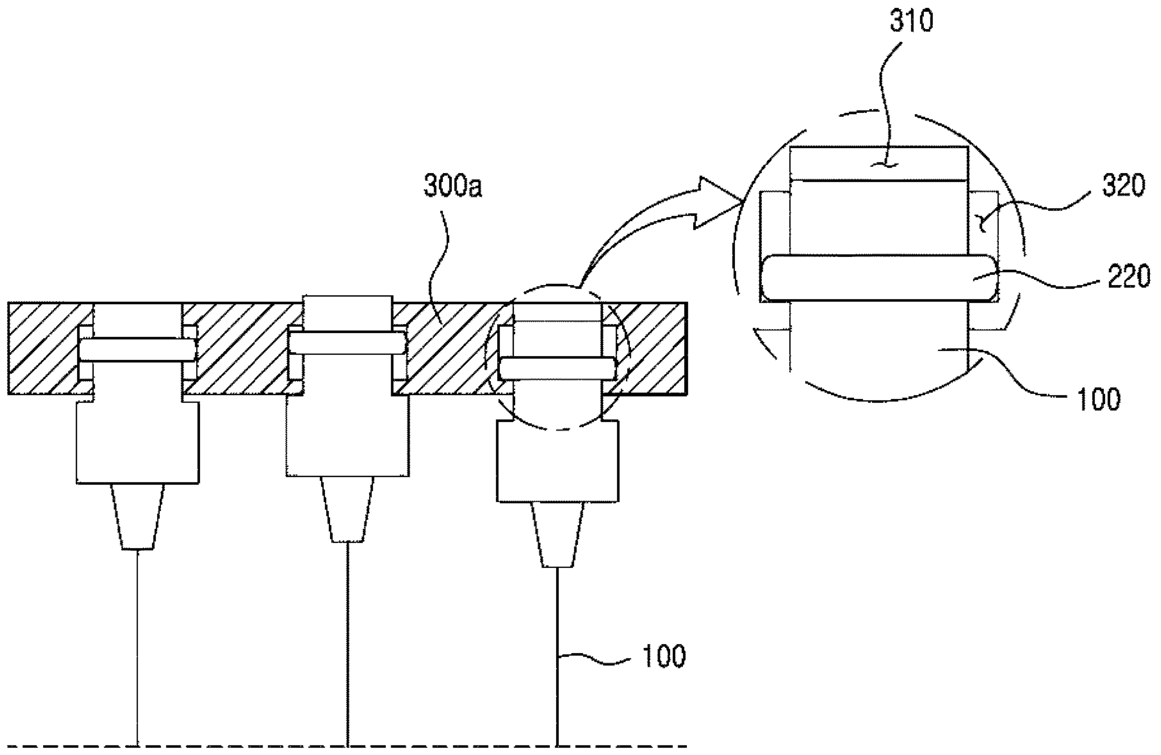
FIG. 5 is a cross-sectional view illustrating a state in which each end portion of the needles in the multi-needle head according to an embodiment of the present disclosure is aligned.

FIG. 4 is a cross-sectional view illustrating both needles and adapters that are applied to the multi-needle head according to an embodiment of the present disclosure. FIG. 5 is a cross-sectional view illustrating a state in which each end portion of the needles in the multi-needle head according to an embodiment of the present disclosure is aligned.

The present disclosure relates to a multi-needle head used in a device that discharges liquid, and may be broadly applied to a device in which a needle is used in a nozzle that discharges liquid. In the present disclosure, using a pressure, an electric field, or the like during a process of discharging liquid is not specifically limited. Further, as long as features of the present disclosure are not impaired, all types of devices may be applicable to the present disclosure. In addition, forms in which liquid is discharged are also not particularly limited. Further, not only when a single droplet is sequentially discharged for forming a pattern or liquid is continuously discharged for spinning but also when droplets are injected in a spray form for coating may be applicable to the present disclosure.

The multi-needle head of the present embodiment includes a nozzle portion 10 in which a plurality of needles is disposed, and the nozzle portion 10 includes at least one adapter 200 in which the plurality of needles is respectively installed and a holder 300 that fixes the adapter 200.

The nozzle portion 10 is an element in which the plurality of needles 100 as a plurality of nozzles is disposed and aligned, the plurality of nozzles being configured such that liquid is discharged therethrough from a head of a liquid discharge device. Further, a manifold configured to uniformly supply the liquid will be described later in detail, and a configuration of the nozzle portion 10 will be described first.

The adapter 200 is an element in which the needle 100 is mounted in a fixed state such that the needle 100 is easily aligned. In the present embodiment, the needle 100 is mounted on a lower portion of a body of the adapter 200, and a fixing groove for fixing an O-ring 220 is formed on an upper portion of the body of the adapter 200. The O-ring 220 is fitted around the body of the adapter 200, and a position of the O-ring 200 with respect to the adapter 200 is fixed. Conventionally, a Luer-lock adapter that fixes a needle via threads was applied as an adapter for fixing a needle, and was useful when the Luer-lock adapter is applied to a head that is provided with a single needle. However, there is a problem that the Luer-lock adapter is difficult to be applied to a multi-needle head that is provided with a plurality of needles. In the present disclosure, the adapter 200 and the holder 300 which are a new type and which solve the problem that occurs when the Luer-lock adapter is applied are provided.

A material of the adapter 200 and a material of the O-ring 220 are not particularly limited, and a suitable material may be applied depending upon the need. When electricity is required to be applied to the needle 100, the adapter 200 may be formed of a conductive material, or the adapter 200 may be formed of a non-conductive material and a conductive structure for applying electricity may be added on the needle 100. In terms of a function of the O-ring 220, it is preferable that the O-ring 220 is applied with a material having a certain degree of elasticity.

The holder 300 is an element that fixes the adapter 200, and is provided with a fixing hole 310 into which the adapter 200 is inserted. The fixing hole 310 is formed in consideration of a cross-sectional shape and a size of the adapter 200, and an O-ring fixing portion 320 having an inner diameter thereof larger than that of the fixing hole 310 is formed in the middle of the fixing hole 310 so that the O-ring 220 is positioned therein. It is preferable that an inner surface of the fixing hole 310 is in close contact with an outer surface of the adapter 200 when the adapter 200 is inserted. Therefore, it is preferable that when liquid is provided to the adapter 200 from above the adapter 200, the liquid moves only through a pipe formed in an inner portion of the adapter 200 and the liquid does not flow between the adapter 200 and the fixing hole 310.

At this time, as described above, in the present embodiment, since the O-ring 220 is mounted on the outer surface of the adapter 200, the adapter 200 on which the O-ring 220 is mounted is unable to be inserted into the fixing hole 310 that is formed in consideration of the outer surface of the adapter 200. Therefore, in the present embodiment, the holder 300 is formed in a separation type, so that the adapter 200 on which the O-ring 220 is mounted can be inserted into the fixing hole 310.

Specifically, in the present embodiment, the holder 300 is separated into two parts in a longitudinal direction in which the plurality of adapters 200 is arranged, and is separated such that vertical cross-sections are formed, so that half of the fixing hole 310 is exposed. In addition, in the middle of the fixing hole 310 of the holder 300 that is applied to the multi-needle head of the present disclosure, since the O-ring fixing portion 320 has the inner diameter thereof larger than that of the fixing hole 310 such that the O-ring 220 is positioned therein, the body of the adapter 200 on which the O-ring 220 is mounted is fixed in a state of being inserted into the fixing hole 310 when the adapter 200 on which the O-ring 220 is mounted is positioned between the parts of the holder 300 that are separated into the two parts and then the separated parts of the holder 300 are fastened to each other.

At this time, a vertical width of the O-ring fixing portion 320 is designed to be larger than a vertical width of the O-ring 220, and each O-ring 220 of each adapter 200 may be inserted and fixed at different heights. In addition, the cross-sectional shape and the size of the O-ring fixing portion 320 are designed in consideration of the O-ring 220, and may be designed to have a size smaller at a predetermined ratio than the size of the O-ring 220 so that the O-ring 220 having elasticity is more strongly fixed. In this structure, when the separated parts of the holder 300 are strongly coupled to each other, the inner surfaces of the fixing hole 310 and the O-ring fixing portion 320 are in close contact with the body of the adapter 200 and the outer surface of the O-ring 220, and the adapter 200 is fixed. Further, a height of the adapter 200 and a height of the O-ring 220 are constantly fixed.

In the illustrated structure, the holder 300 is separated in the longitudinal direction in which the plurality of adapters 200 is arranged, but the holder 300 may be shortly separated in a front-rear direction. In this situation, although the number of separated parts of the holder 300 increases, utilization of the holder 300 increases by adding or removing the holder 300 depending on the number of needles 100 and the number of adapters 200. In the illustrated structure, the holder 300 is required to be separately manufactured depending on the number of adapters 200. However, as the number of parts of the holder 300 is constant at two, the assembly process is more easily performed. Therefore, it is preferable to select the appropriate type of holder 300 by considering the utilization of the holder 300 and ease of assembly of the holder 300. In addition, in the illustrated structure, the holder 300 is separated by cutting the holder 300 in a direction perpendicular to the ground. However, the holder 300 may be separated by cutting the holder 300 in a direction horizontal to the ground. When the holder 300 is separated by cutting across the O-ring fixing portion, the holder 300 may be assembled by coupling the parts of the holder 300 after mounting the O-ring 220 on the adapter 200 while the adapter 200 is inserted into the part of the holder 300. when the holder 300 is separated in the direction horizontal to the ground, the assembly process of the holder 300 is more complicated. However, on an upper surface of the adapter 200 to which the liquid is injected, there is no gap due to the separation of the holder 300, so that the risk of leakage of the liquid in the process of supplying the liquid is reduced.

When the nozzle portion 10 is assembled by fastening the holder 300 in a state in which the adapter 200 is partially inserted as illustrated in FIG. 1, as illustrated in FIG. 2, the nozzle portion 10 in a form in which a connection hole formed in the adapter 200 is exposed on an upper surface of the nozzle portion 10 such that the liquid is ready to be supplied to the needle 100. The manifold for supplying liquid may be coupled to the upper portion of the nozzle portion 10, which will be described in detail later.

The structure of the adapter 200 and the structure of the holder 300 are configurations for aligning an end portions of the needles 100 that are respectively mounted on the plurality of adapters 200. As illustrated in FIG. 4, although the adapters 200 are manufactured in the same size and the same shape, due to the difference in length of each needle 100 that is mounted on each adapter 200, heights of the end portions of the needles 100 are different from each other when the end portions of the needles 100 are aligned on the basis of the adapters 200. In this state as described above, when the liquid is discharged, there is a problem that the heights at which the liquid is discharged are different. Depending on the purpose of discharging the liquid, the different heights of the discharged liquid may not be a problem. However, in a precise operation, a problem depending on the different heights of the discharged liquid occurs. For example, when a precise coating by electro-spraying is performed, and when the electro-spraying is performed at different heights, a difference occurs in a range of the liquid that is sprayed from each needle, so that a problem that a thickness of a coating layer varies for each position occurs. Therefore, it is necessary to align the end portions of the needles 100 to be the same height, regardless of the length of each needle 100.

As described above, in the multi-needle head of the present embodiment, since the vertical width of the O-ring fixing portion 320 that is formed in the fixing hole 310 of the holder 300 is larger than the vertical width of the O-ring 220, the height at which the O-ring 220 is fixed may be adjusted. Further, as illustrated in FIG. 5, the fixed height of the adapter 200 may be adjusted on the basis of the end portion of the needle 100. When the holder 300 is assembled and fixed while the height of the end portion of the needle 100 is in a constant state, the nozzle portion 10 in which the heights of the end portions of the needles 100 where the liquid is discharged are aligned to be the same may be realized.

Hereinafter, with respect to the nozzle portion 10 of the multi-needle head of the present embodiment, a method of aligning the heights of the end portions of the needles 100 to be the same and a method of assembling the nozzle portion 10 will be described.

Figure 6:
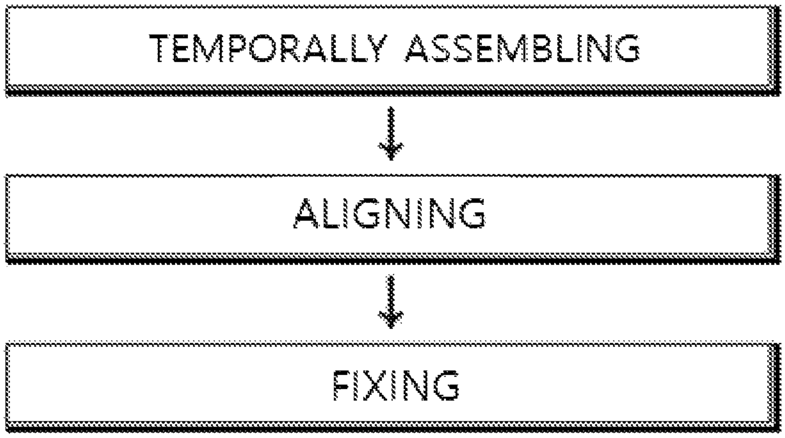
FIG. 6 is a flowchart illustrating a method of aligning each end portion of the needles of the multi-needle head according to an embodiment of the present disclosure.

FIG. 6 is a flowchart for explaining a method of aligning each end portion of the needles of the multi-needle head according to an embodiment of the present disclosure.

An aligning method of the present embodiment is a method of aligning the heights of the end portions of the needles 100 to be the same and of assembling the needle portion 10 during a process of assembling the nozzle portion 10 of the multi-needle head illustrated in FIGS. 1 to 5, and includes temporally assembling, aligning, and fixing.

The temporally assembling refers to a state in which the adapter 200 on which the O-ring 220 is mounted is inserted into the fixing hole 310 of the holder 300 but the holder 300 separated into a plurality of parts is not completely fastened. In the state in which the holder 300 is not completely fastened, the adapter 200 is in a state in which the adapter 200 that is inserted into the fixing hole 310 is capable of being moved vertically. Further, when the holder 300 is fastened by using a bolt, the bolt may not be fully tightened. In addition, it is possible to fix the holder 300 by using a temporary fixing device. Further, when a method other than bolting is applied, the method may be applied by modifying a suitable process.

In the aligning, the adapters 200 are moved in the nozzle portion 10 that is temporally assembled such that the heights of the end portions of the needles 100 are adjusted to be the same. The method of aligning the heights of the end portions of the needles 100 to be the same is variously realized. For example, it is possible to perform a method that allows all needles 100 to be in contact with a flat surface by standing up the nozzle portion 10 such that the needles 100 face down on the flat surface.

The fixing process is a process that fixes the adapters 200 such that the adapters 200 respectively inserted into the fixing holes 310 are not moved, which is realized by completely fastening the holder 300 while the heights of the end portions of the needles 100 are constantly aligned when the assembling is completed. In the fixing process, the final assembly of the nozzle portion 10, which is not the temporally assembling process, is performed. In addition, when the bolting fastening is performed, the bolt is completely tightened such that the adapters 200 are not moved. Further, when other fastening method is applied, the nozzle portion 10 is assembled by fastening the holder 300 such that the adapters 200 are not moved.

When the method as described above is applied, the heights of the end portions of the needles 100 that are mounted in the multi-needle head are aligned to be the same and the nozzle portion 10 is assembled. Further, in the liquid discharge device that uses the multi-needle head, working accuracy of the liquid discharge device is improved since the liquid is discharged at the same height.

Hereinafter, an alignment device which is used in the process of aligning the heights of the end portions of the needles 100 of the multi-needle head and the process of assembling the multi-needle head and which is used by the method as described above will be described.

Figure 7:
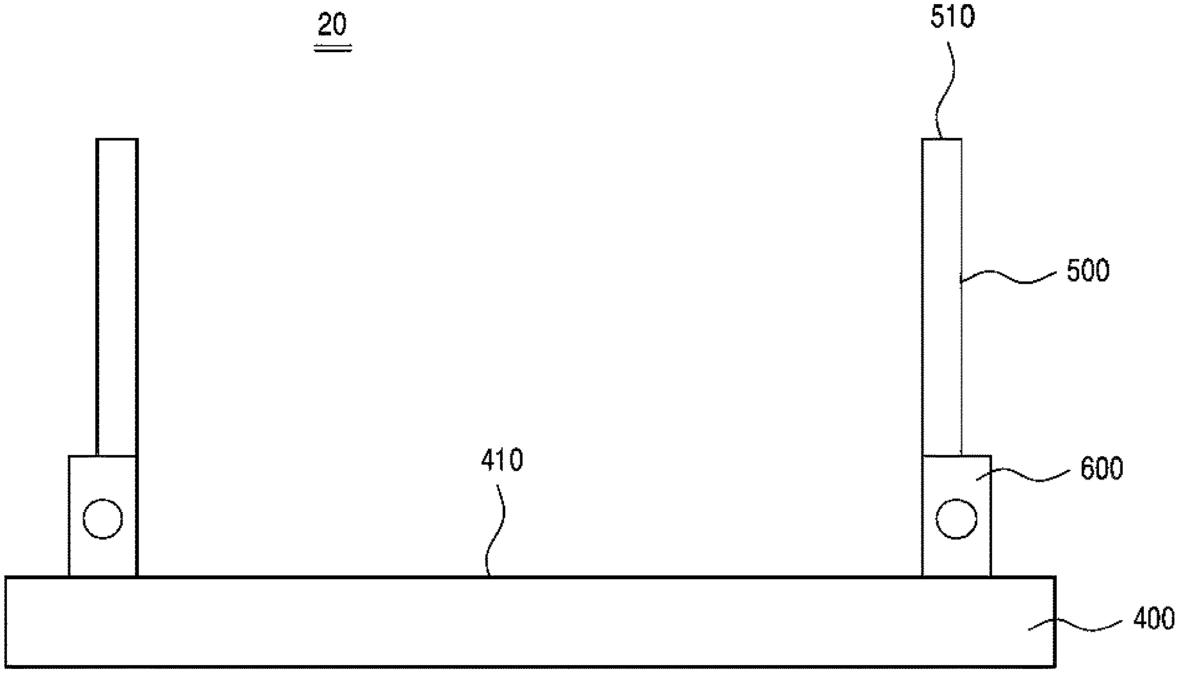
FIG. 7 is a view illustrating a structure of an alignment device that is for aligning each end portion of the needles of the multi-needle head according to an embodiment of the present disclosure.
Figure 8:
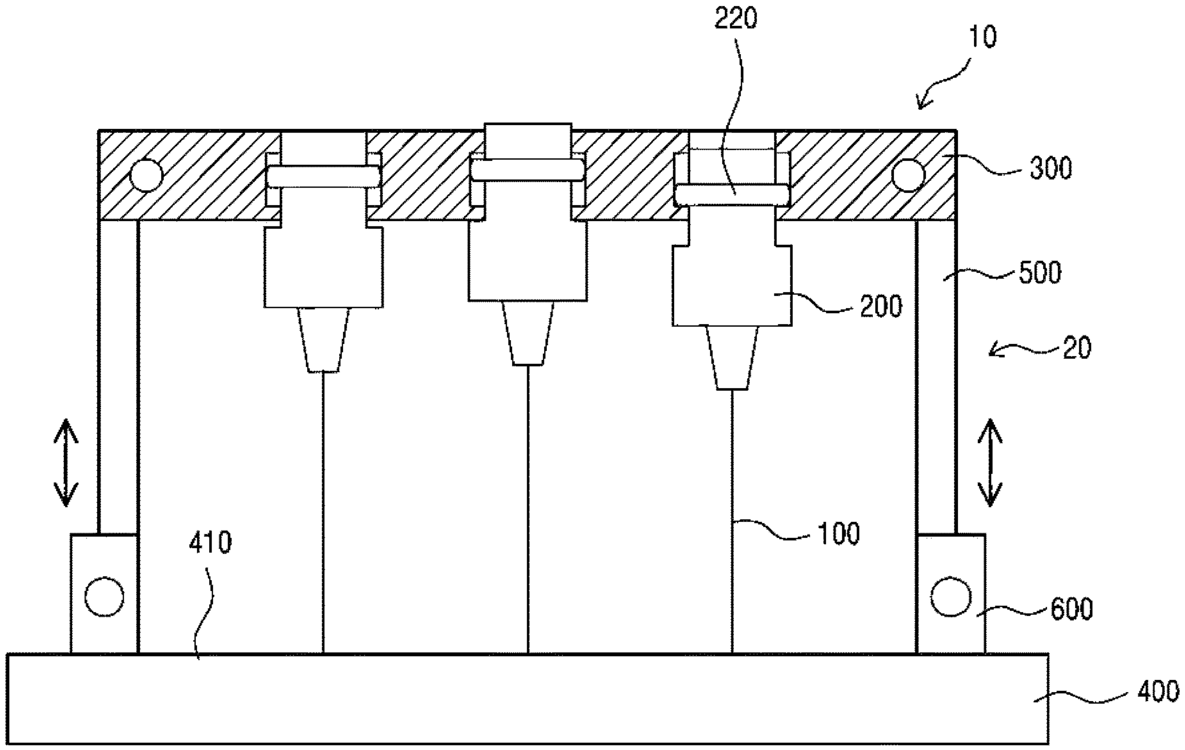
FIG. 8 is a view illustrating a state in which each end portion of the needles of the multi-needle head is aligned by using the alignment device in FIG. 7.

FIG. 7 is a view illustrating a structure of an alignment device that is for aligning each end portion of the needles of the multi-needle head according to an embodiment of the present disclosure. FIG. 8 is a view illustrating a state in which each end portion of the needles of the multi-needle head is aligned by using the alignment device in FIG. 7.

The alignment device 20 for aligning the multi-needle head according to an embodiment of the present disclosure includes a reference portion 400, a stand 500, and an adjusting portion 600.

The reference portion 400 is configured to match the end portions of the needles 100. Further, the reference portion 400 has a reference surface 410 that is horizontal, so that the end portions of the needles 100 are positioned on a horizontal plane when the end portions of the needles 100 are in contact with the reference surface 410.

The stand 500 includes a stand surface 510 that is configured to hold the holder 300 in which the adapter 200 is mounted, and is configured to maintain a space between a bottom surface of the holder 300 and the reference surface 410.

The adjusting portion 600 is configured to adjust the space between the bottom surface of the holder 300 and the reference surface 410. In the structure illustrated in FIG. 7, a position of the stand surface 510 is adjusted by moving the stand 500 in the vertical direction such that a length of the stand 500 is adjusted. By using the adjusting portion 600, the space between the reference surface 410 and the bottom surface of the holder 300 that is placed on the stand surface 510 is adjusted, so that a precise alignment may be realized while the heights of the end portions of the needles 100 are aligned.

Specifically, when the holder 300 is positioned on the reference surface 510 of the alignment device 20 while the holder 300 in which the adapters 200 are inserted is not completely fastened, the O-ring 200 is not completely fixed by the O-ring fixing portion 320 of the holder 300, so that the adapters 200 can be moved in the vertical direction. In this manner, by adjusting the length of the stand 500 by using the adjusting portion 600 when in the state in which the adapters 200 are capable of being moved, the space between the bottom surface of the holder 300 and the reference surface 410 is adjusted such that all of the end portions of the needles 100 are in a state of being in contact with the reference surface 410. When all of the end portions of the needles 100 are in contact with the reference surface 410 and the end portions of the needles 100 are aligned, the holder 300 is completely fastened, and the adapters 200 are strongly fixed such that the adapters 200 are unable to be moved in the vertical direction.

In this manner, when the alignment device 20 according to an embodiment of the present disclosure is used, the nozzle portion 10 may be assembled while positions of the end portions of the needles 100 are horizontally aligned.

Figure 9:
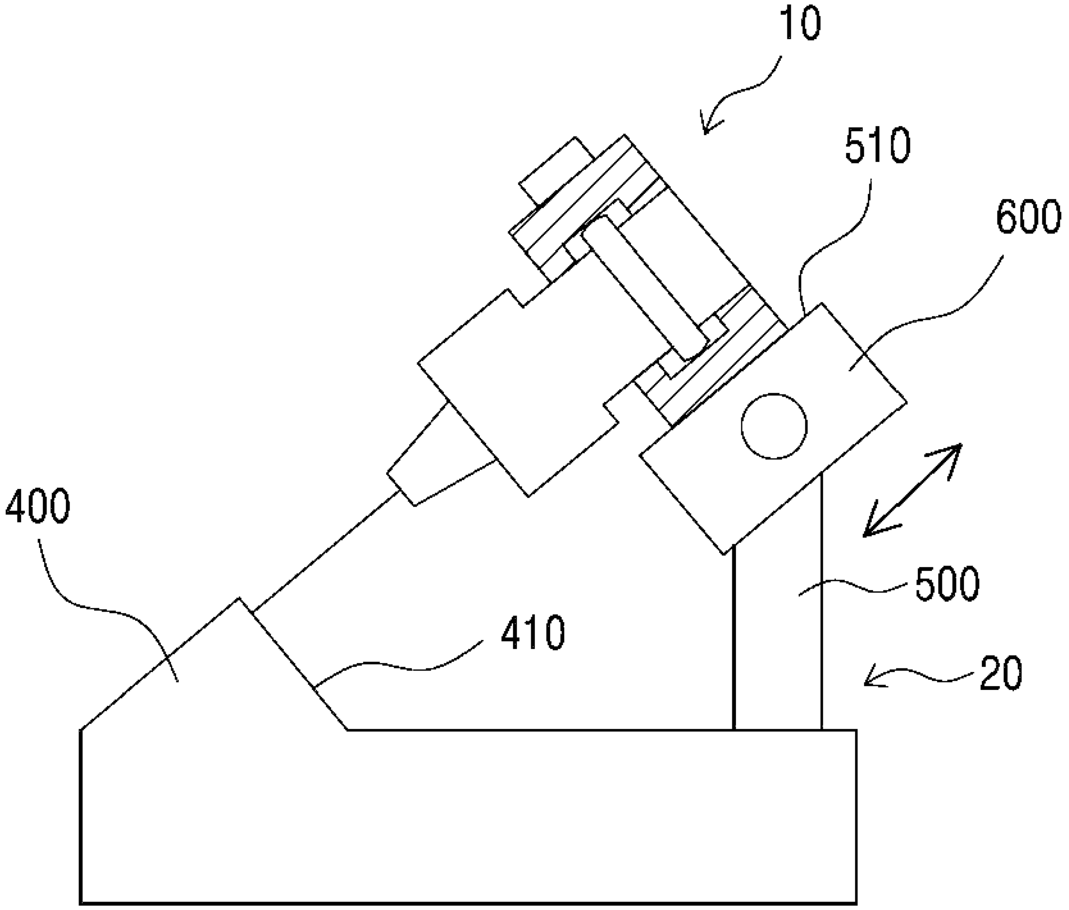
FIG. 9 is a view illustrating another type of the alignment device that is for aligning each end portion of the needles of the multi-needle head according to an embodiment of the present disclosure and illustrating a state in which each end portion of the needles is aligned by using another type of the alignment device.

FIG. 9 is a view illustrating another type of the alignment device that is for aligning each end portion of the needles of the multi-needle head according to an embodiment of the present disclosure and illustrating a state in which each end portion of the needles is aligned by using another type of the alignment device.

In the alignment device having the structure as illustrated in FIG. 7, as illustrated in FIG. 8, all the weight of the nozzle portion 10 is applied to the needles 100, so that there may be a problem that a shape of each needle 100 in which a thickness thereof is thin is deformed. As a method to solve this problem, another type of the alignment device 20 in which the weight of the nozzle portion 10 that is placed is not concentrated on the needles 100 but dispersed is illustrated in FIG. 9.

The reference portion 400 is configured to match the end portions of the needles 100. Further, the reference surface 410 that is flat is formed but the reference surface 410 is disposed to be inclined at a predetermined angle. At this time, since the arrangement of the reference surface 410 is only inclined and the reference surface 410 is a flat plane, the heights of the end portions of the needles 100 are aligned to be the same when the end portions of the needles 100 are in contact with the reference surface 410.

The stand 500 includes the stand surface 510 that is configured to hold the holder 300 in which the adapter 200 is mounted, and is configured to maintain the space between the bottom surface of the holder 300 and the reference surface 410. In the present embodiment, the stand surface 510 is tilted to a predetermined angle corresponding to the reference surface 410, and a side surface of the holder 300 is placed on the stand surface 510. In this manner, since not the bottom surface of the holder 300 but the side surface of the holder 300 is placed on the stand surface 510, there is an effect that the weight applied to the needles 100 is dispersed.

The adjusting portion 600 is configured to adjust the space between the bottom surface of the holder 300 and the reference surface 410. In the present embodiment, the space between the bottom surface of the holder 300 and the reference surface 410 is adjusted by moving the adjusting portion 600 in a diagonal direction that is perpendicular to the reference surface 410.

Specifically, when the side surface of the holder 300 is placed on the reference surface 510 of the alignment device 20 such that the holder 300 is diagonally positioned while the holder 300 in which the adapters 200 are inserted is not completely fastened, the adapters 200 can be moved in the diagonal direction since the O-ring fixing portion 320 of the holder 300 are not completely fixing the O-ring 220. In this manner, when in the state in which the adapters 200 are capable of being moved, the space between the bottom surface of the holder 300 and the reference surface 410 is adjusted such that all of the end portions of the needles 100 are in a state of being in contact with the reference surface 410 by using the adjusting portion 600. When all of the end portions of the needles 100 are in contact with the reference surface 410 and the end portions of the needles 100 are aligned, the holder 300 is completely fastened, and the adapters 200 are strongly fixed such that the adapters 200 are unable to be moved.

In this manner, when the alignment device 20 according to an embodiment of the present disclosure is used, the nozzle portion 10 may be assembled while the weight applied to the needles 100 is dispersed and positions of the end portions of the needles 100 are horizontally aligned.

Hereinafter, a configuration of the manifold which is coupled to the nozzle portion 10 mounted with the needles 100 and which is configured to supply the liquid will be described, and the multi-needle head in which the nozzle portion 10 and the manifold are coupled will be described.

Figure 10A:
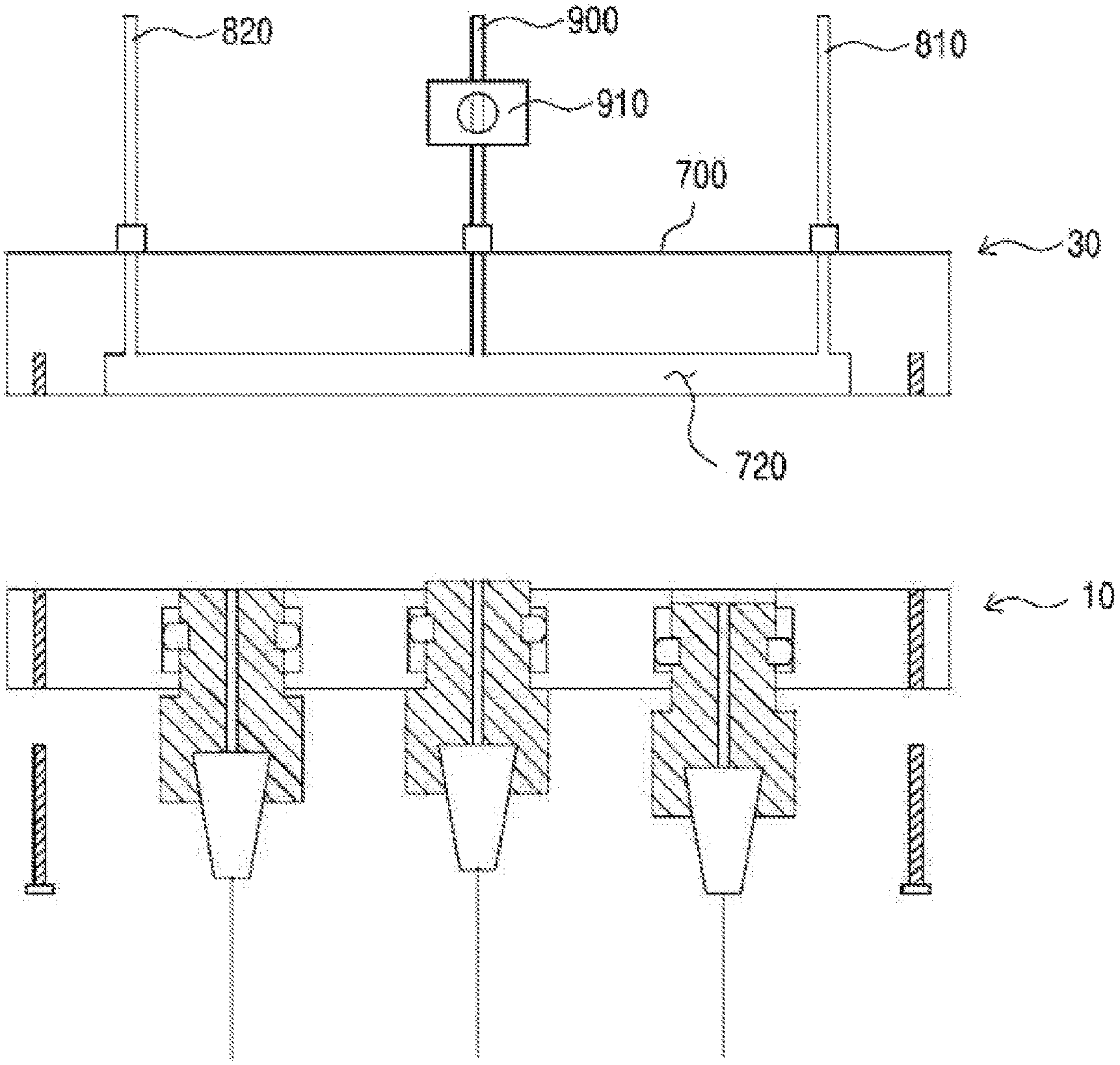
FIGS. 10A and 10B are views illustrating a manifold applied to the multi-needle head according to an embodiment of the present disclosure.
Figure 10B:
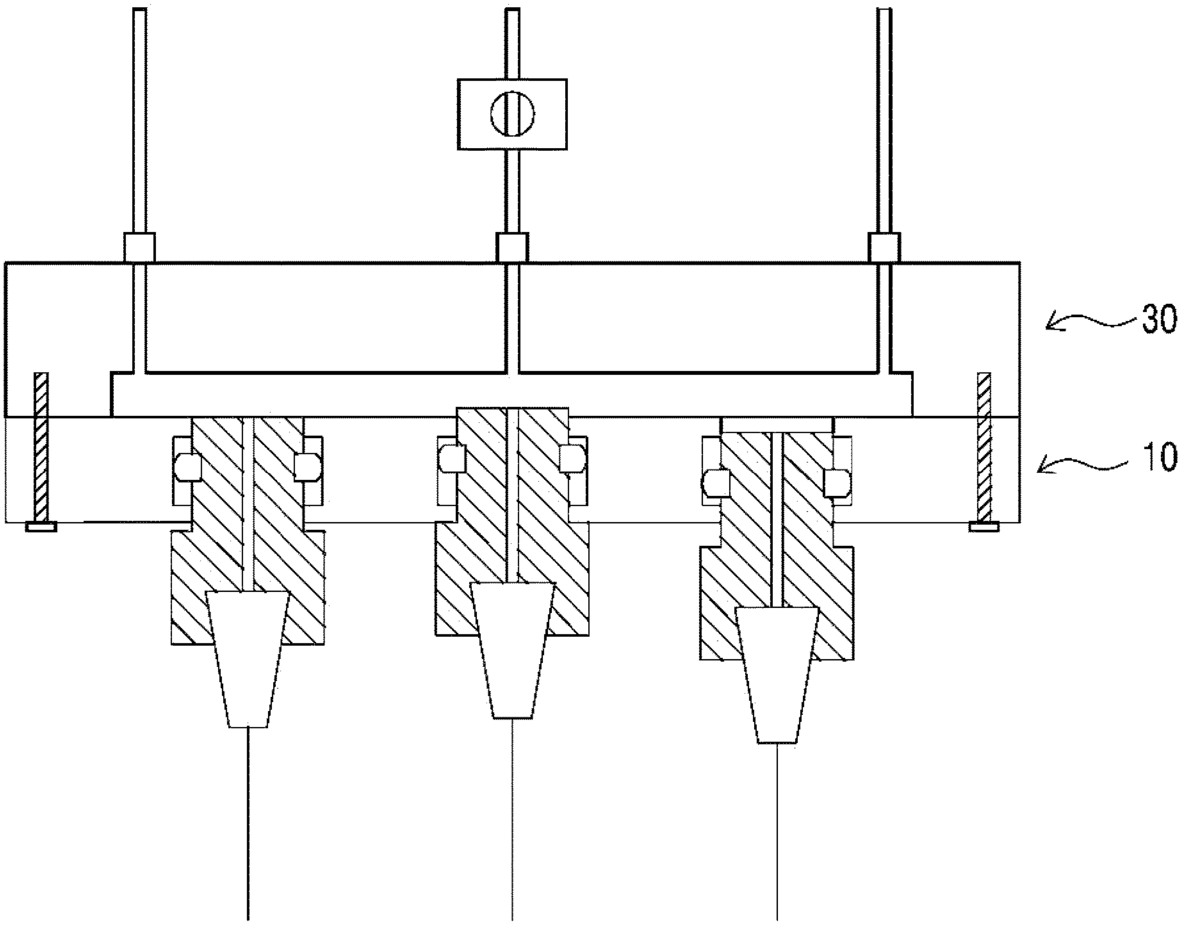
Figure 11:
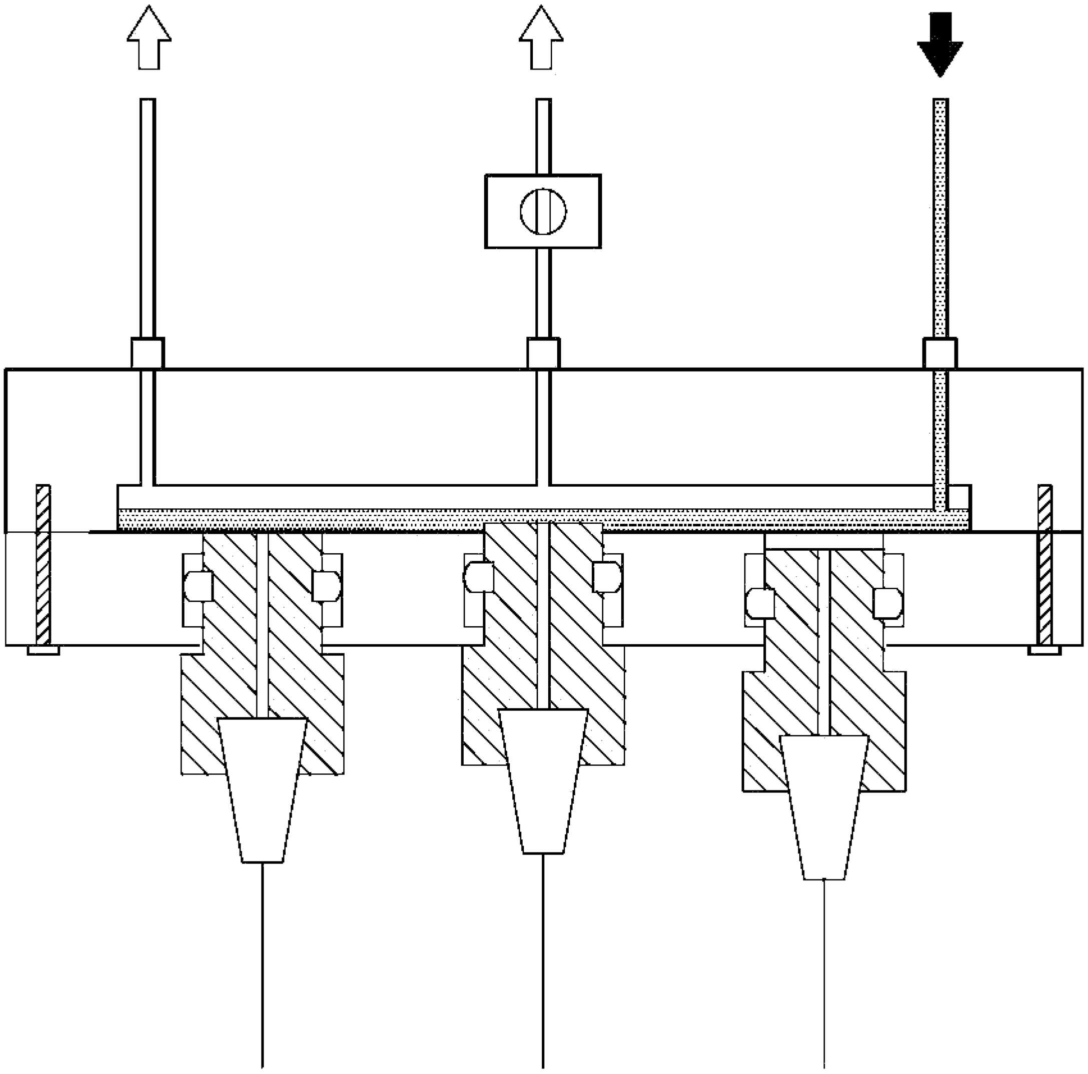
FIG. 11 is a view illustrating a state in which a discharged liquid is initially supplied to the multi-needle head according to an embodiment of the present disclosure.
Figure 12:
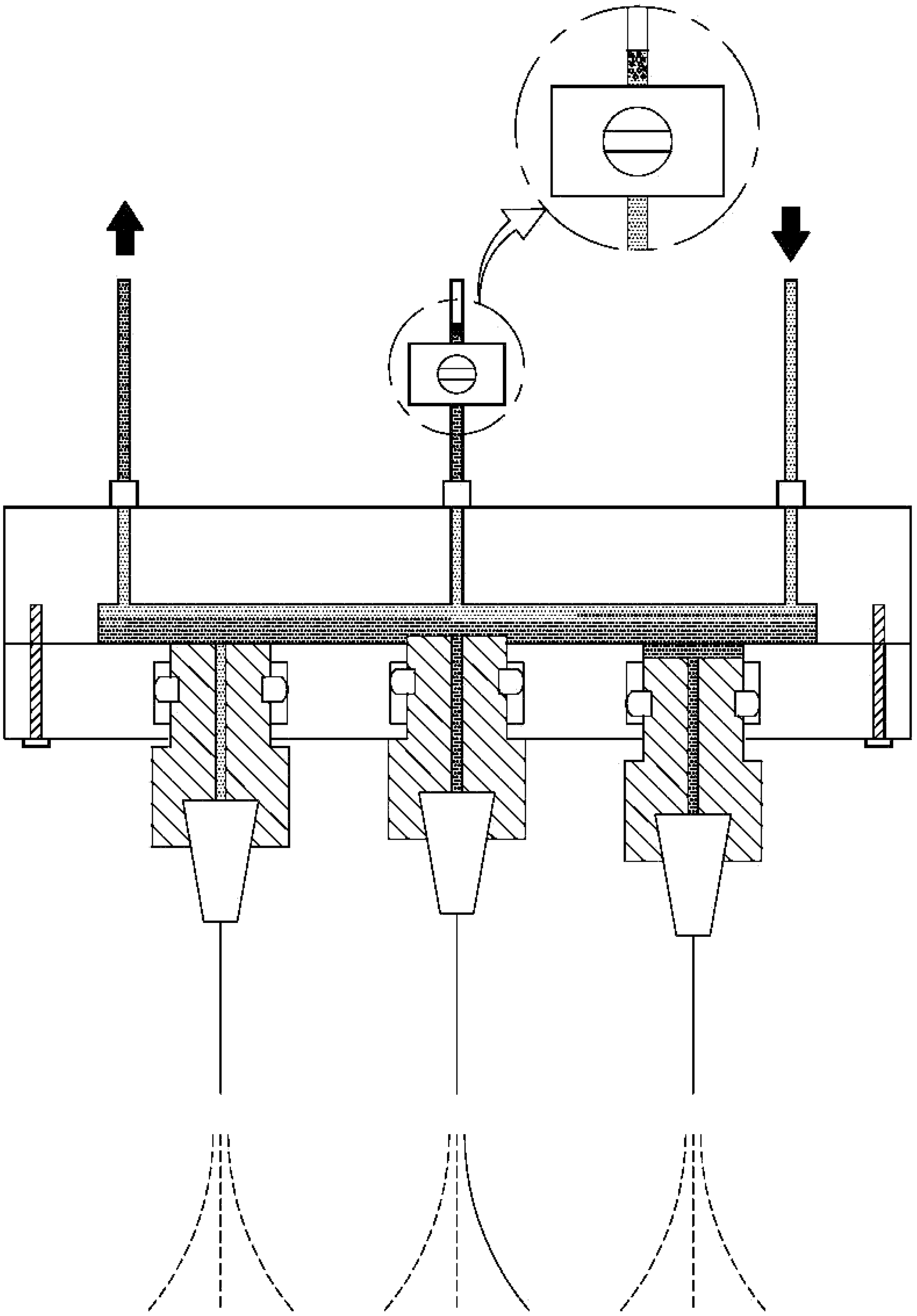
FIG. 12 is a view illustrating a state in which the discharged liquid is injected through the needles of the multi-needle head according to an embodiment of the present disclosure.

FIGS. 10A and 10B are views illustrating a manifold applied to the multi-needle head according to an embodiment of the present disclosure. FIG. 11 is a view illustrating a state in which a discharged liquid is initially supplied to the multi-needle head according to an embodiment of the present disclosure. FIG. 12 is a view illustrating a state in which the discharged liquid is injected through the needles of the multi-needle head according to an embodiment of the present disclosure.

FIG. 10A is a cross-sectional view illustrating a state before coupling the manifold and the nozzle portion in the multi-needle head according to an embodiment of the present disclosure, and FIG. 10B is a cross sectional view illustrating a state in which the manifold and the nozzle portion in the multi-needle head according to an embodiment of the present disclosure are coupled.

The manifold 30 in the present embodiment is coupled to the upper portion of the nozzle portion 10, and a supply pipe 810, a collecting pipe 820, and an exhaust pipe 900 are connected to a housing 700 in which a cavity 720 is formed.

The cavity 720 that is formed by opening a lower surface of the housing 700 is positioned on a position corresponding to the connecting holes that are respectively formed on the adapters 200 in order to supply the liquid exposed on the upper surface of the nozzle portion 10 to the needles 100. In the multi-needle head in which the liquid is discharged to the plurality of needles 100, since the liquid is required to be simultaneously discharged at the same discharge pressure from the plurality of needles 100, the single cavity 720 in which a predetermined amount of ink can be filled is formed on the upper portion of the nozzle portion 10. In this manner, when the liquid is additionally input after the liquid is fully filled in the single cavity 720 that is connected to all of the plurality of the adapters 200, the liquid is discharged at the same discharge pressure from the plurality of needles 100 by an input pressure. The size of the cavity 720 is not specifically determined, and may be variously adjusted depending on the need.

The supply pipe 810 is connected to the cavity 720, and is configured to supply the liquid to the cavity 720. In a general needle head, a supply pipe for supplying liquid to a needle is only provided. However, in the present embodiment, the collecting pipe 820 and the exhaust pipe 900 are additionally connected to the housing 700 of the manifold 30.

As described above, when the cavity 720 is formed such that the liquid is simultaneously discharged from the plurality of needles 100 that is mounted in the multi-needle head, the liquid is started to be discharged after the cavity 720 is completely filled. At this time, during a process of filling the cavity 720, there is a high possibility that bubbles may be generated or air remaining in the cavity 720 becomes bubbles. Further, when bubbles are moved into the needles 100, bubbles interrupt the liquid from being moved into the needles 100 that have small inner diameters. Generally, the pressure applied during the process of discharging the liquid is not sufficient to remove bubbles that are blocking the needles, so that there is a problem that the operation is required to be performed after the entire device is stopped and bubbles are removed.

In the present embodiment, by using the collecting pipe 820 and the exhaust pipe 900, the problem caused by bubbles generated inside the cavity 720 may be prevented. At the beginning of injecting the liquid, the generation of bubbles may be prevented by discharging air existing inside the cavity 720 to the outside through the collecting pipe 820 and the exhaust pipe 900. Next, when in a situation in which the cavity 720 is fully filled with the liquid and a liquid discharge operation is performed, bubbles inside the cavity 720 may be discharged through the collecting pipe 820 instead of the needles 100 by discharging the ink through the collecting pipe 820. In the exhaust pipe 900, a valve 910 is mounted, so that the exhaust pipe 900 can be opened when the exhaust pipe 900 is required to be opened, such as at the beginning of injecting the liquid. Further, the exhaust pipe 900 is configured to be closed in other situations.

In addition, when the cavity 720 is formed such that the liquid is simultaneously discharged from the plurality of needles 100 that is mounted in the multi-needle head, there is no problem when the discharging of the liquid is continuously performed. However, when the discharging of the liquid is stopped, a problem occurs by the liquid remaining in the cavity 720. For example, various substances configuring the liquid are required to be evenly mixed. However, while the liquid stagnates in the cavity 720, there may be a problem that the homogeneity of the liquid may collapse, such as the separation of the substances due to a difference in a specific gravity or the like. However, in the present embodiment, since the collecting pipe 820 is added, the liquid does not stagnate in the cavity 720 and is discharged through the collecting pipe 820, so that the liquid is continuously moved and maintains the homogeneity.

A method of coupling the manifold 30 and the nozzle portion 10 to each other is not specifically limited, and the fastening method by using the bolt as illustrated in the drawings may be applied or other methods may be applied.

Hereinafter, a process of using the multi-needle head in which the nozzle portion 10 and the manifold 30 are coupled to each other will be described.

In the multi-needle head of the present disclosure, an initial process in which the cavity 720 that is formed above the adapters 200 is filled is performed before the operation of discharging the liquid is performed. The liquid is supplied to the cavity 720 through the supply pipe 810, and air filled inside the cavity 720 is discharged through the collecting pipe 820. At this time, when the valve 910 connected to the exhaust pipe 900 is opened, the air inside the cavity 720 is further discharged through the exhaust pipe 900, so that the air is quickly discharged. Therefore, the air is prevented from remaining inside the cavity 720 and from generating bubbles. In addition, since the thickness of each needle 100 is very thin, the discharging of the liquid through the needles 100 does not occur during the initial process in which the cavity 720 is filled with the liquid.

When the cavity 720 is sufficiently filled, the valve 910 is closed. Further, it is preferable that the valve 910 is closed after the air inside the cavity 720 is completely discharged. At this time, there is a high possibility that bubbles are generated during the process of filling the cavity 720. However, as illustrated in the drawings, when the valve 910 is closed after a predetermined amount of an upper portion of the liquid containing microbubbles is discharged to the outside of the valve 910 through the exhaust pipe 900, not only the air inside the cavity 720 but also microbubbles generated during filling the cavity 720 with the liquid may be removed. The collecting pipe 820 maintains an open state. Finally, the cavity 720 is fully filled with the liquid while microbubbles are removed through the exhaust pipe 900.

By blocking a flow of the liquid inside the collecting pipe 820 or increasing a flow rate of the liquid that flows into the supply pipe 810 to be larger than a flow rate of the liquid that flows into the collecting pipe 820 after the cavity 720 is completely filled with the liquid, the operation of discharging the liquid through the needles 100 may be performed.

As described above, when the liquid is discharged to the outside through the collecting pipe 820 while the operation of discharging the liquid is being performed, bubbles generated inside the cavity 720 or bubbles introduced through the supply pipe 810 do not block the needles and are discharged to the outside through the collecting pipe 820.

In summary, in the method of using the multi-needle head as described above, the liquid discharge device including the multi-needle head of the present disclosure may be divided into a preparation process and an operation process depending on a process in which the liquid discharge device is used.

The preparation process is a process in which the device is prepared before the operation of discharging the liquid is performed. Further, in the multi-needle head having the structure as described above, since the cavity 730 adjacent to the nozzle portion 10 is required to be completely filled with the liquid so as to discharge the liquid at the same pressure from all of the needles 100, the process of filling the liquid in the cavity 720 is performed. The air is filled inside the cavity 720 before the liquid is injected into the cavity 720 through the supply pipe 810 that is connected to the manifold 30. Further, during a process of injecting the liquid through the supply pipe 810, it is preferable that the air filled inside the cavity 720 is not moved to the supply pipe 810. In the present embodiment, the air is discharged through the collecting pipe 820, and the air inside the cavity 720 is also discharged through the exhaust pipe 900 in which the valve 910 is opened. Therefore, the air inside the cavity 720 is easily discharged. Further, during this process, the problem that the air flows backward to the supply pipe 810 or bubbles stagnate inside the cavity 720 does not occur.

The operation process is a process in which the discharging of the liquid is performed after the liquid is completely filled inside the cavity 720 and preparing for other portions is completed. At this time, the valve 910 of the exhaust pipe 900 is closed, and the liquid is prevented from leaking into the exhaust pipe 900. In addition, by discharging the liquid through the collecting pipe 820 at all times or optionally depending on the need, bubbles introduced into the cavity 720 are discharged together with the liquid through the collecting pipe 820, so that the problem that bubbles block the needles 100 does not occur. Meanwhile, the valve 910 of the exhaust pipe 900 is closed when the operation of discharging the liquid is performed. However, the valve 910 is not always closed when the cavity 720 is filled with the liquid. During the operation, it is also possible to stop the operation for the purpose of maintenance or the like, and then bubbles inside the cavity 720 can be removed by opening the valve 910 while the cavity 720 is filled with the liquid.

By applying the structure and the using method as described above, the problem that bubbles are generated inside the multi-needle head which discharges the liquid from the plurality of needles 100 may be reduced. Further, there is an effect that bubbles do not block the needles 100 and are discharged outside the multi-needle head even if bubbles are generated or introduced. Although the preferred embodiments of the present disclosure have been disclosed for illustrative purposes, those skilled in the art will appreciate that various modifications, additions and substitutions are possible, without departing from the technical idea of the present disclosure. Therefore, the scope of protection of the present disclosure should be determined by the scope of the appended claims, rather than the specific embodiments, and all technical ideas falling within the scope of the claims should be construed as being included in the scope of the present disclosure.

What is claimed is:

1. A multi-needle head comprising:

at least one adapter mounted with a needle in which liquid is discharged therethrough; and a holder in which the adapter is fixed, wherein an O-ring having an outer diameter thereof larger than a width of a body of the adapter is coupled to the body of the adapter, a fixing hole into which the body of the adapter is inserted is formed in the holder, and an O-ring fixing portion having an inner diameter thereof larger than an inner diameter of the fixing hole is formed in the middle of the fixing hole such that the O-ring is positioned at the O-ring fixing portion, wherein a vertical width of the O-ring fixing portion is larger than a vertical width of the O-ring, thereby allowing a height of the adapter that is fixed to the holder to be adjusted.

2. The multi-needle head of claim 1, wherein the holder is formed of a plurality of parts that is cut on the basis of the fixing hole, and the plurality of parts is assembled after the adapter to which the O-ring is coupled is inserted into the holder while the plurality of parts that forms the holder is in a separated state.

3. The multi-needle head of claim 2, wherein when the holder formed of the plurality of parts is assembled, a position of the adapter is fixed.

4. The multi-needle head of claim 1, further comprising a manifold which is coupled to an upper portion of the holder and which is configured to supply the liquid to a plurality of needles, wherein a housing of the manifold is provided with a cavity which is filled with the liquid and which is formed on a position corresponding to the adapter, and the housing of the manifold is provided with a supply pipe through which the liquid is supplied to the cavity and a collecting pipe through which the liquid inside the cavity is discharged outside.

5. The multi-needle head of claim 4, further comprising an exhaust pipe connected to the cavity, wherein a valve configured to open and close the exhaust pipe is mounted on the exhaust pipe.

6. A method of aligning an end portion of the needle of the multi-needle head of claim 3, the method comprising:

temporally assembling a holder by inserting an adapter into a fixing hole of the holder and assembling the holder to an extent that a height of the adapter is capable of being adjusted;

aligning a height of the end portion of the needle by adjusting the height of the adapter; and fixing the holder so that the height of the adapter is fixed.

7. A device for aligning an end portion of a needle of the multi-needle head of claim 3, the device comprising:

a reference portion provided with a reference surface that is a flat surface capable of matching a height of the end portion of the needle to be constant;

a stand provided with a stand surface on which a holder of the multi-needle head is placed, the stand being configured to maintain a space between the reference surface and the stand surface; and an adjusting portion capable of adjusting a space between a bottom surface of the holder and the reference surface, wherein when the multi-needle head is in a state of being placed on the stand surface, the space between the bottom surface of the holder and the reference surface is adjusted until each end portion of all of a plurality of needles is in contact with the reference surface.

8. The device of claim 7, wherein the reference surface is inclined at a predetermined angle to the ground, and a stand surface is arranged at an angle perpendicular to the reference surface so that the multi-needle head is diagonally placed.

* * * * *